(12) United States Patent
Ruider et al.

(10) Patent No.: US 11,739,798 B2
(45) Date of Patent: Aug. 29, 2023

(54) CLAW COUPLING FOR INTERLOCKINGLY CONNECTING A FIRST ROTATABLE COMPONENT TO A SECOND ROTATABLE COMPONENT

(71) Applicant: ZF Friedrichshafen AG, Friedrichshafen (DE)

(72) Inventors: Martin Ruider, Schwarzhofen (DE); Patrick Isele, Constance (DE); Kim Führer, Lindau (DE); Marcel Müller, Cologne (DE); Matthias Winkel, Weingarten (DE); Werner Herbert Brandwitte, Langerwehe (DE); Klaus Ventzke, Langerwehe (DE); Fernando Jesus Ramos Zuniga, Stolberg (DE); Stephan Demmerer, Wasserburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 55 days.

(21) Appl. No.: 17/436,471

(22) PCT Filed: Mar. 5, 2020

(86) PCT No.: PCT/EP2020/055929
§ 371 (c)(1),
(2) Date: Sep. 3, 2021

(87) PCT Pub. No.: WO2020/182630
PCT Pub. Date: Sep. 17, 2020

(65) Prior Publication Data
US 2022/0196081 A1    Jun. 23, 2022

(30) Foreign Application Priority Data
Mar. 11, 2019  (DE) .................... 10 2019 203 255.9

(51) Int. Cl.
*F16D 11/14* (2006.01)
*F16D 11/00* (2006.01)

(52) U.S. Cl.
CPC ........ *F16D 11/14* (2013.01); *F16D 2011/004* (2013.01)

(58) Field of Classification Search
CPC ............... F16D 11/14; F16D 2011/002; F16D 2011/004; F16D 2300/24; F16D 2048/0215; F16F 5/00; F16F 9/10; F16F 9/103
See application file for complete search history.

(56) References Cited

U.S. PATENT DOCUMENTS

| | | | | |
|---|---|---|---|---|
| 2004/0206597 | A1* | 10/2004 | Creger | F16D 48/02 192/85.34 |
| 2013/0206539 | A1* | 8/2013 | AbuSamra | F16D 25/063 192/82 R |
| 2020/0008991 | A1* | 1/2020 | Wu | F16F 9/103 |
| 2021/0148415 | A1* | 5/2021 | Bolle | F16D 23/12 |

FOREIGN PATENT DOCUMENTS

| | | |
|---|---|---|
| DE | 2936968 A1 | 4/1981 |
| DE | 19903115 A1 | 8/2000 |

(Continued)

OTHER PUBLICATIONS

International Search Report and Written Opinion for PCT/EP2020/055929 dated Jun. 26, 2020 (11 pages; with English translation).

*Primary Examiner* — Stacey A Fluhart
(74) *Attorney, Agent, or Firm* — Kristin L. Murphy

(57) ABSTRACT

The disclosure relates to a claw coupling for interlockingly connecting a first rotatable component to a second rotatable component, wherein a sliding sleeve is non-rotatably and axially slidably arranged on the first rotatable component and a coupling body is non-rotatably arranged on the second rotatable component, the sliding sleeve being axially movable for interlocking connection to the coupling body in (Continued)

order to connect the first component to the second component, at least one spring-loaded shifting ring being movably mounted, non-rotatably and axially relative to the sliding sleeve, on the sliding sleeve, and a damping chamber, formed in dependence on the relative motion, is provided in order to delay the axial motion. The disclosure further relates to an electrical drive axle of a vehicle having at least the claw coupling. In addition, the disclosure relates to a method for interlockingly connecting the first rotatable component to the second rotatable component via a claw coupling.

16 Claims, 5 Drawing Sheets

(56) References Cited

FOREIGN PATENT DOCUMENTS

| | | | |
|---|---|---|---|
| DE | 102011010616 A1 | 1/2012 | |
| DE | 102010062664 A1 * | 6/2012 | ............... F16D 11/14 |
| DE | 102012210287 A1 | 12/2013 | |
| DE | 10201205174 A1 | 9/2014 | |
| DE | 102013019093 A1 | 5/2015 | |
| DE | 102014015093 A1 | 4/2016 | |
| DE | 102017204113 A1 | 9/2018 | |
| DE | 102018207628 A1 | 11/2019 | |
| WO | WO-2005103521 A1 * | 11/2005 | ............ F16D 25/083 |
| WO | WO-2006000907 A1 * | 1/2006 | ............ B60T 11/165 |
| WO | 2017075180 A1 | 5/2017 | |

* cited by examiner

CLAW COUPLING FOR INTERLOCKINGLY CONNECTING A FIRST ROTATABLE COMPONENT TO A SECOND ROTATABLE COMPONENT

CROSS-REFERENCE TO RELATED APPLICATIONS

This application is a national stage of International Application No. PCT/EP2020/055929, filed Mar. 5, 2020, the disclosure of which is incorporated herein by reference in its entirety, and which claimed priority to German Patent Application No. 102019203255.9, filed Mar. 11, 2019, the disclosure of which is incorporated herein by reference in its entirety.

TECHNICAL FIELD

The present disclosure relates to a claw coupling for interlockingly connecting a first rotatable component to a second rotatable component. The disclosure relates further to an electric drive axle of a vehicle having a claw coupling. In addition, the disclosure relates to a method for interlockingly connecting two rotatable components by a claw coupling.

BACKGROUND

Claw couplings, which are also referred to as interlocking shift elements, are well known from vehicle technology. For example, it is known from publication DE 10 2011 010 616 A1 of a drive train for a motor vehicle having an actuatable claw coupling. The known claw coupling comprises a first coupling part having a first toothed arrangement and a second coupling part having a second toothed arrangement, which can be brought into engagement with one another for torque transmission. For actuating the first coupling part, an actuator having an actuator motor is provided, the rotational movement of which is converted via a spindle and a nut into a pivoting movement of a shift fork, which is coupled with the first coupling part in order to bring the toothed arrangements of the coupling parts into engagement. It has been shown that meshing of the toothed arrangements is occasionally prevented due to tooth-to-tooth positions. This results in considerable mechanical stresses on the actuator as a result of the sudden blocking of the coupling part. Moreover, in addition to the mechanical stresses, undesirable acoustic noise occurs, in particular on elimination of the tooth-to-tooth position.

Accordingly, what is needed is a claw coupling and an electric drive axle having a claw coupling and also a method for interlockingly connecting two components by a claw coupling, in which the components can be connected as quickly and as noiselessly as possible.

SUMMARY

A claw coupling, or an interlocking shift element, is disclosed for interlockingly connecting a first rotatable component to a second rotatable component, wherein a sliding sleeve as the first coupling element is non-rotatably and axially displaceably arranged, for example, on the first rotatable component and a coupling body as the second coupling element is non-rotatably arranged, for example, on the second rotatable component. The sliding sleeve is axially movable for interlocking connection to the coupling body in order to connect the first component to the second component. In order to ensure that the components are shifted, or interlockingly connected, as quickly and as noiselessly as possible, at least one spring-loaded shift ring or the like is mounted on the sliding sleeve so as to be non-rotatable and axially movable relative to the sliding sleeve, wherein a damping chamber formed in dependence upon the relative movement is provided for slowing down the axial movement of the sliding sleeve and the shift ring.

By providing a shift ring, a sliding sleeve of multi-part form is produced, so that a relative movement between the sliding sleeve and the shift ring is made possible. Consequently, for example in the case of a blocked sliding sleeve due to a tooth-to-tooth position, further movement of the shift ring is made possible and, in an advantageous manner, the damping chamber is thereby formed, in order to prevent unnecessary mechanical stress in particular on the actuator of the claw coupling. Even when the tooth-to-tooth position is eliminated and the shift ring moves abruptly as a result, stresses and undesirable acoustic noise are prevented in the proposed claw coupling in that the damping medium which has flowed into the damping chamber is compressed. At the same time, sufficient shift dynamics is ensured.

In one exemplary arrangement, the damping chamber can be provided, according to the available installation space, in a region of the sliding sleeve and the shift ring. It is, however, also conceivable that the damping space is provided in the region of the actuator.

A further exemplary development of the disclosure which is structurally simple and advantageous in terms of installation space provides that the damping chamber is formed by a relative movement between the sliding sleeve and the shift ring in that the shift ring is associated as an annular piston or the like with the annular-cylindrical damping chamber formed at least by the sliding sleeve. Other structural forms of the damping chamber are also possible. In particular, it is possible that the cylindrical chamber as the damping chamber is formed by the sliding sleeve and a corresponding shaping of the sliding sleeve or by a separate component on the sliding sleeve.

For the performance of the shifting movements, or for the interlocking connection, of the components in the claw coupling, a corresponding actuation for the axial movement of the sliding sleeve is provided. This actuation can take place mechanically, electrically, hydraulically or the like. Regardless of the type of actuation, the actuation is coupled with the shift ring in order to correspondingly actuate the sliding sleeve.

In order to produce the relative movement between the shift ring and the sliding sleeve in a particularly simple way, in one exemplary arrangement, it is provided that the shift ring is coupled with the sliding sleeve via at least one spring element or the like. The spring element thereby acts as a kind of energy store and can thus make possible a relative movement between the two components.

For the inflow and outflow of a damping medium into and out of a damping chamber during a relative movement between the sliding sleeve and the shift ring, there can be associated with the damping chamber, for example, at least one vent opening of any desired shape. Through the vent opening, air or an air-oil mixture from the surroundings can enter the damping chamber if required and, if required, can also be discharged into the surroundings again. The damping medium forms a kind of air-oil cushion with which the axial movement of the shift ring can be correspondingly braked, for example after the sudden meshing of the sliding sleeve, and the shifting movement can thus be damped.

To correspondingly control the inflow and outflow of the damping medium into and out of the damping chamber, in order to be able to adjust the behavior of the shifting movement, or axial movement of the claw coupling, in one exemplary arrangement, it can be provided within the scope of a next further development of the disclosure that there is associated with each vent opening at least one diaphragm or the like for controlling the inflowing and outflowing damping medium.

To correspondingly seal the damping chamber formed by the shift ring as an annular piston and the sliding sleeve as the annular chamber, it is provided that there is associated with the damping chamber in the region of the shift ring at least one sealing lip, which has the effect that a negative pressure forms, by means of which the damping medium can be drawn in through the vent opening.

A further aspect of the present disclosure provides that an electric drive axle of a vehicle having at least one above-described claw coupling is claimed. Use in an electric drive axle, which has, for example, an electric machine as the drive, a transmission stage and an axle differential, is particularly suitable since electric drives are in themselves very quick and soundless, and consequently a claw coupling that works quickly and noiselessly is also particularly advantageous. The proposed claw coupling can, however, also be used in other applications.

In addition, the disclosure also claims a method for interlockingly connecting two components by an exemplary arrangement of the above-described claw coupling. Within the scope of the proposed method, a relative movement between the sliding sleeve and the shift ring coupled with the sliding sleeve in the case of a tooth-to-tooth position is correspondingly damped.

BRIEF DESCRIPTION OF THE DRAWINGS

The present disclosure will be explained in greater detail hereinbelow with reference to the drawings, in which.

DETAILED DESCRIPTION

Figure 1:
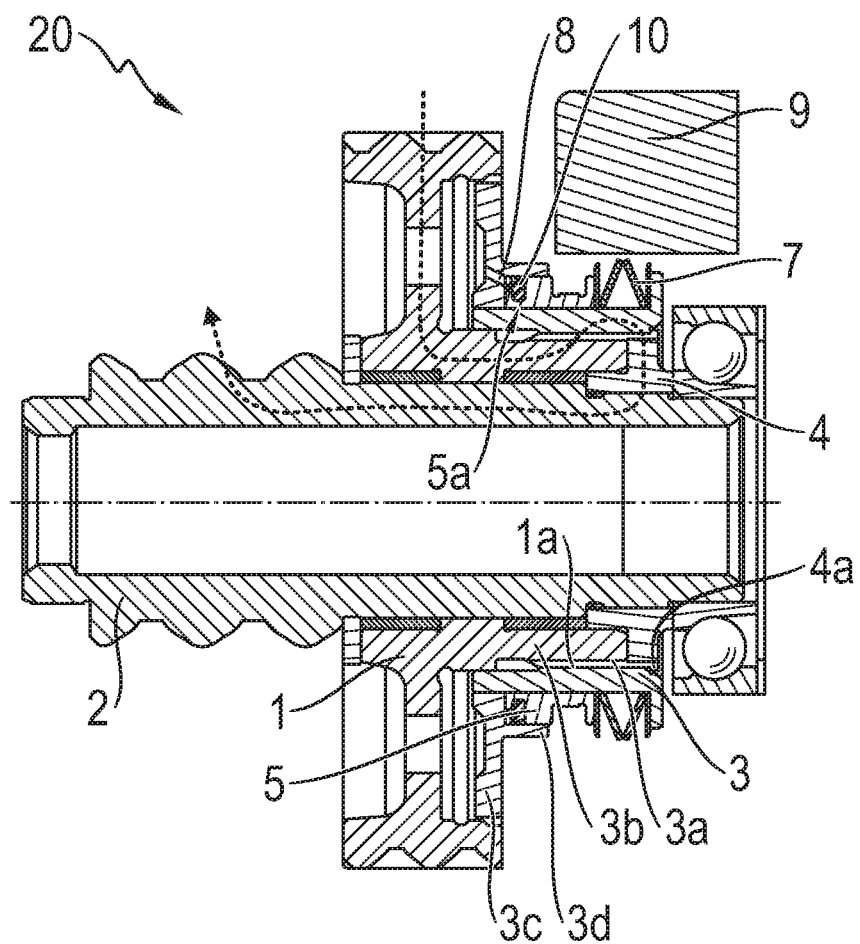
FIG. 1 is a cutaway view of a possible exemplary arrangement of a claw coupling according to the disclosure with components which are interlockingly connected together.

In FIGS. 1 to 9, various views and illustrations of an exemplary arrangements of a claw coupling 20 according to the disclosure for interlockingly connecting a first rotatable component 1 to a second rotatable component 2 are illustrated by way of example.

In one exemplary arrangement, the claw coupling 20 according to the disclosure comprises a sliding sleeve 3, which in the exemplary arrangement shown is non-rotatably and axially displaceably arranged, for example, on the first rotatable component 1. For this purpose, there can be provided on the sliding sleeve 3 and on the component 1 toothed arrangements 3a; 1a which are in engagement with one another, or alternative structures in the form of radial profiles or the like which are in engagement with one another. In the exemplary arrangement shown, the first rotatable component 1 is in the form of, for example, a spur gear. The claw coupling 20 further comprises a coupling body 4 which is non-rotatably arranged on the second rotatable component 2. In the exemplary arrangement shown, the second rotatable component 2 is in the form of, for example, a shaft.

The sliding sleeve 3 is axially movable for interlocking connection to the coupling body 4 in order to non-rotatably connect the first component 1, or the spur gear, or the movable gear, to the second component 2, or the shaft. The sliding sleeve 3 and the coupling body 4 have for this purpose corresponding toothed arrangements 3a; 4a which can be brought into mutual engagement. In the present exemplary case, the toothed arrangement 3a thus allows the sliding sleeve 3 to be connected to the first component 1 and optionally also the sliding sleeve 3 to be connected to the coupling body 4, although it does not necessarily have to be so constructed. That is to say, it is also possible for a separate toothed arrangement to be formed on the sliding sleeve for each connection. In the shifted or connected state of the claw coupling 20, the first rotatable component 1 is connected to the second rotatable component 2 for torque transmission. The corresponding force flow is indicated in FIG. 1 by a dotted line. Consequently, a torque can be transmitted between the shaft, or the second rotatable component 2, and the spur gear, or the first rotatable component 1. In the non-shifted or unconnected state of the claw coupling 20, the shaft, or the second rotatable component 2, and the spur gear, or the first rotatable component 1, are not coupled with one another.

In order to couple the two components 1, 2 as quickly and as noiselessly as possible via the claw coupling 20, it is provided that at least one spring-loaded shift ring 5 is mounted on the sliding sleeve 3 so as to be non-rotatable and axially movable relative to the sliding sleeve 3, wherein a damping chamber 6 (see e.g. FIG. 3) formed in dependence upon the relative movement, is provided for slowing down the axial movement of the sliding sleeve 3 and the shift ring 5. In the exemplary arrangement, this damping chamber 6 is in the form of an annular chamber at the sliding sleeve 3 which is open axially on one side and which the shift ring 5, on the one hand, can enter with at least an end portion 5a. On the other hand, the shift ring 5 with the end portion 5a can be displaced axially in the annular chamber and/or, when specific states are present, as will be explained herein below, can be guided out of the annular chamber. As can be seen in the figures, the sliding sleeve 3 comprises, for forming the annular chamber or damping chamber 6, a cylindrical portion 3b having the toothed arrangement 3a, and a radial flange 3c from which an annular prolongation 3d protrudes axially.

Because the sliding sleeve 3 is coupled with the shift ring 5 via at least one spring element 7, for example a helical compression spring, plate spring or the like, in order to permit relative movements, for example in a tooth-to-tooth position, on the one hand relative movements between the sliding sleeve 3 and the shift ring 5 and on the other hand slowing down of the axial movements during the shifting movements of the claw coupling 20, as it were, are achieved, so that, via the spring element 7, shifting force can continue to be applied to the sliding sleeve 3 even in a tooth-to-tooth position, and nevertheless no undesirable shifting noise is generated. As a result, a rapid elimination behavior of the tooth-to-tooth position is made possible, since the shifting force increases constantly and at the same time cannot block the actuator. In order that the shift ring 5 does not strike the sliding sleeve 3 in an unbraked manner after elimination of the tooth-to-tooth position, the shift ring 5 enters the damping chamber 6 and is braked by a damping medium, for example an air-oil cushion, which builds up there or is located there. The damping characteristic can additionally be influenced by at least one vent opening 8 at the damping chamber 6. In addition, the damping medium is flung out of the damping chamber 6 by the rotation, so that the damping has almost no temperature dependence. Consequently, with the proposed claw coupling 20, on the one hand a high shift dynamics can be ensured and on the other hand undesirable shifting noise can be prevented.

Since the damping chamber 6 is formed by the relative movement between the sliding sleeve 3 and the shift ring 5, the damping chamber 6 is present only if damping of the axial movement is necessary, for example when a tooth-to-tooth position occurs. The shift ring 5 is associated as an annular piston, for example, with the annular-cylindrical damping chamber 6 formed at least by the sliding sleeve 3. In the exemplary arrangement shown, the annular-cylindrical damping chamber 6 is spanned in particular by the spatial region formed radially between the annular prolongation 3*d* and the cylindrical portion 3*b* of the sliding sleeve 3.

For actuation of the claw coupling 20, the shift ring 5 is coupled with an actuator 9 for the axial movement of the shift ring 5 and the associated sliding sleeve 3. The shift ring 5 is coupled with the sliding sleeve 3 via the spring element 7, in order that the above-described relative movement between the shift ring 5 and the sliding sleeve 3 is made possible even when the sliding sleeve 3 is blocked owing to a tooth-to-tooth position.

Figure 2:
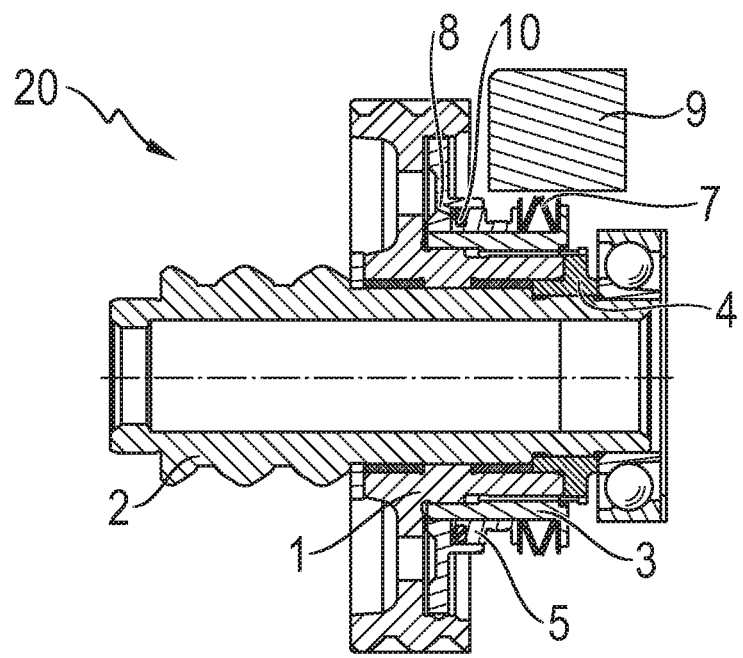
FIG. 2 is a cutaway view of the claw coupling in an unconnected state of the components.
Figure 3:
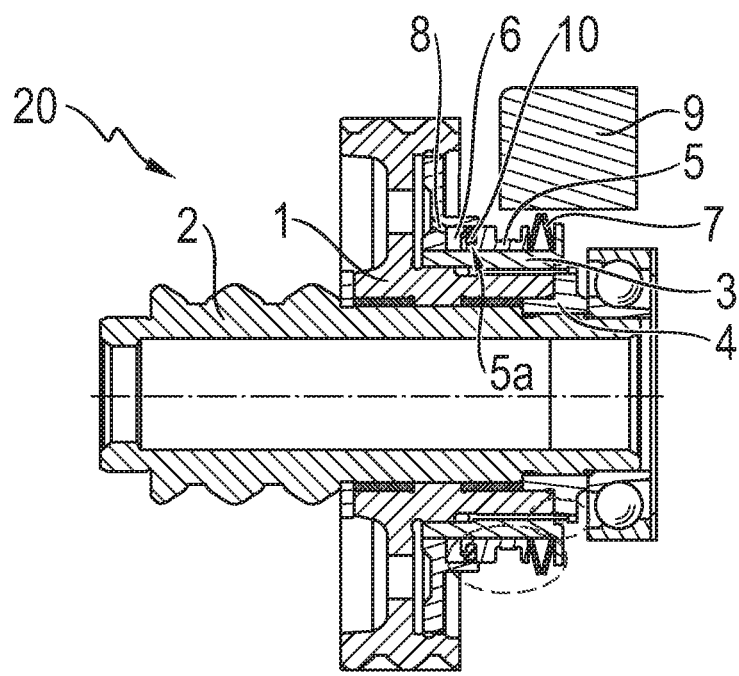
FIG. 3 is a cutaway view of the claw coupling in a tooth-to-tooth position.
Figure 4:
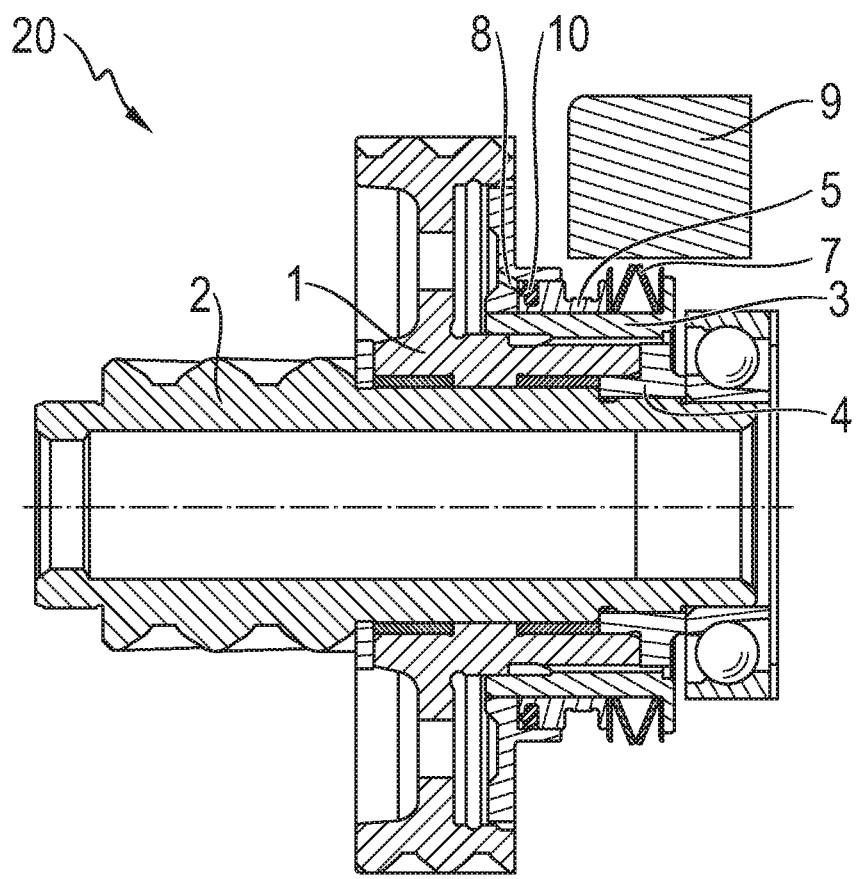
FIG. 4 is a cutaway view of the claw coupling after elimination of the tooth-to-tooth position, with interlockingly connected components.

While FIG. 1 shows the coupled state of the claw coupling 20, FIG. 2 illustrates the uncoupled state of the two components 1, 2. Proceeding from this state, the spring element 7 can be tensioned between the shift ring 5 and the sliding sleeve 3 in the case of a tooth-to-tooth position, shown in FIG. 3, of the sliding sleeve 3 and, owing to the resulting relative movement between the sliding sleeve 3 and the shift ring 5, the damping chamber 6 is formed. The damping chamber 6 forms, as it were, through the further axial movement of the shift ring 5, since the sliding sleeve 3 is blocked owing to the tooth-to-tooth position. After elimination of the tooth-to-tooth position, which is illustrated in FIG. 4, and relaxation of the spring element 7, the comparatively rapid relative movement between the shift ring 5 and the sliding sleeve 3 is braked, or damped, by the damping medium which has flowed into the damping chamber 6 via the vent opening 8, since a rapid outflow of the damping medium is prevented by a comparatively small cross section of the vent opening 8 and a cushion of the damping medium can thus dissipate only comparatively slowly. The axial return movement of the sliding sleeve 3 relative to the shift ring 5 is thus slowed down. Consequently, noiseless meshing of the sliding sleeve 3 into the toothed arrangement of the coupling body 4 for the interlocking connection of the two components 1, 2 can be achieved.

The components 1, 2 shown by way of example in FIGS. 1 to 4 are part of an electric drive axle of a vehicle, in which the above-described claw coupling 20 is provided for separating an electric drive from the drive shafts of the vehicle in order to reduce drag torque. Use in an electric drive axle is particularly advantageous since, with such a drive axle, any noise is generally perceived by the driver. It is all the more important that the shifting operation of the claw coupling 20 for connecting the components 1, 2 is carried out quickly and noiselessly.

FIGS. 5 to 9 show schematic illustrations of the claw coupling 20. By means of these illustrations, the method, which is also claimed, for interlockingly connecting the two components 1, 2 by an exemplary arrangement of the claw coupling 20 will be described herein below.

In the method according to the disclosure, the relative movement between the sliding sleeve 3 and the shift ring 5 coupled with the sliding sleeve 3 is damped in the case of a tooth-to-tooth position in that a relative movement between the sliding sleeve 3 and the shift ring 5 on occurrence of a tooth-to-tooth position is first made possible and, after elimination of the tooth-to-tooth position, the relative movement is braked.

Figure 5:
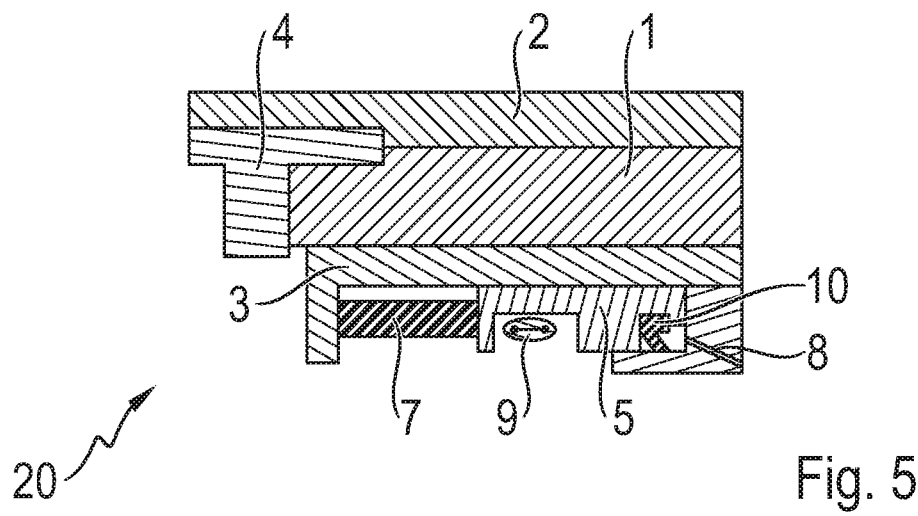
FIGS. 5-9 are schematic illustrations of the claw coupling according to the disclosure in various states.
Figure 6:
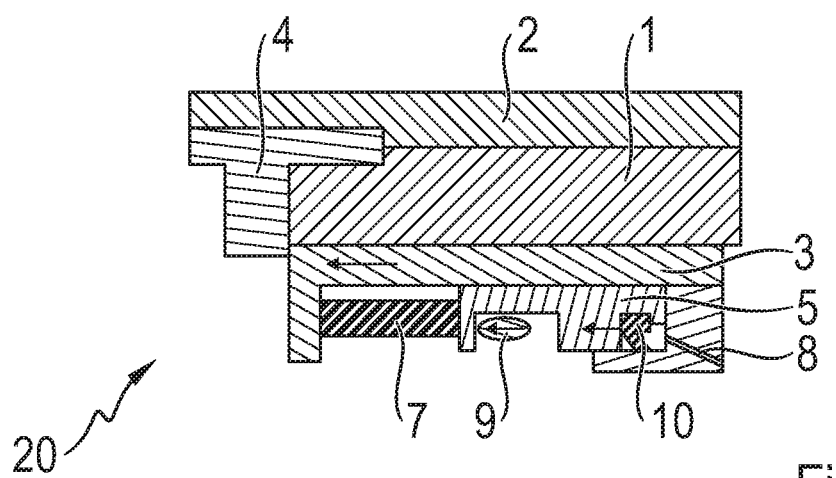

For this purpose, FIG. 5 shows the state in which the two components 1, 2 are not coupled with one another. In FIG. 6, a corresponding shifting force is transmitted via the actuator 9 to the shift ring 5 for the axial movement of the shift ring 5. This shifting force is also transmitted via the spring element 7 to the sliding sleeve 3, so that the sliding sleeve is likewise moved axially.

Figure 7:
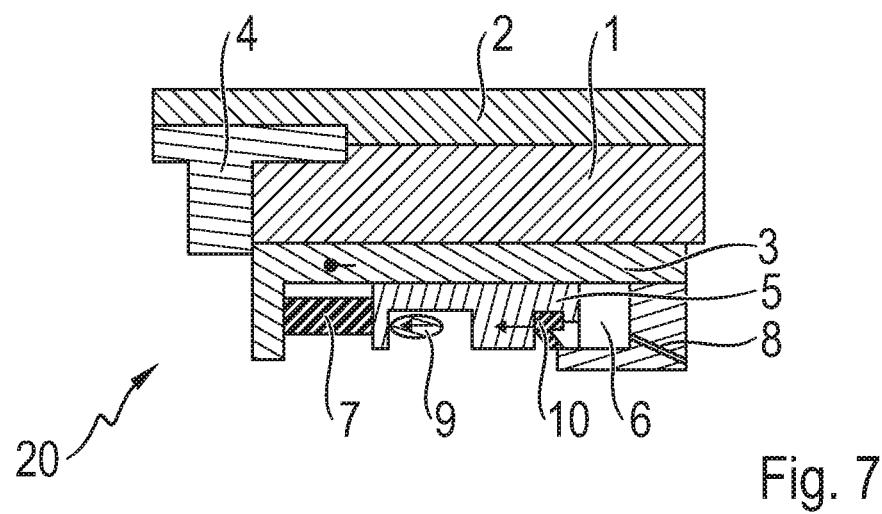

In the tooth-to-tooth position illustrated in FIG. 7, the sliding sleeve 3 is no longer able to be moved further axially. Consequently, a relative movement takes place between the sliding sleeve 3 and the shift ring 5 since, by the compression of the spring element 7, further movement of the shift ring 5 is made possible. As a result of the further axial movement of the shift ring 5, the damping chamber 6 is formed, or spanned, between the shift ring 5 and the sliding sleeve 3, as is made clear in FIG. 7.

Figure 8:
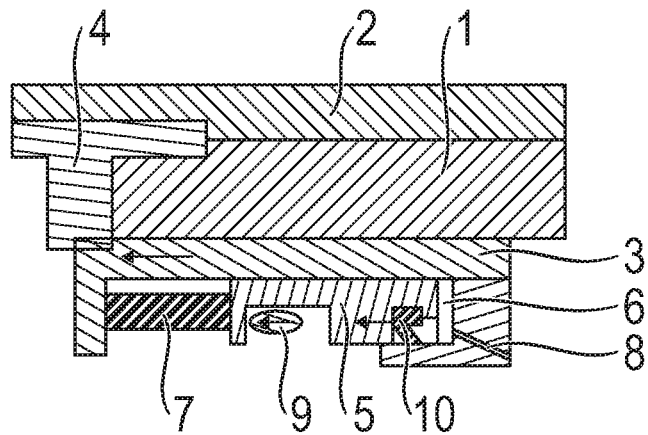
Figure 9:
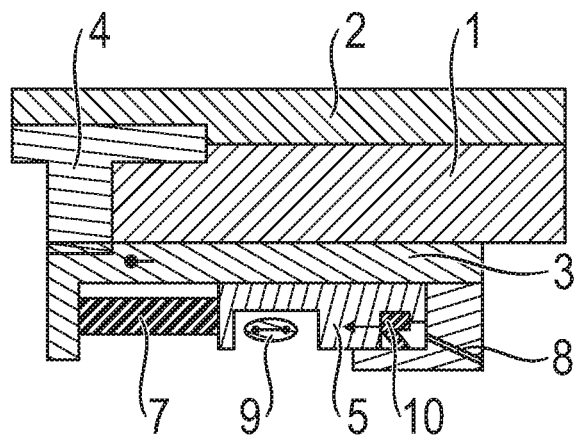

As a result of the axial movement of the shift ring 5, damping medium is able to flow into the damping chamber 6 through the vent opening 8. Furthermore, the spring element 7 is pretensioned owing to the axial movement of the shift ring 5 relative to the sliding sleeve 3. When the tooth-to-tooth position is eliminated, which is illustrated in FIG. 8, and the sliding sleeve 3 is able to mesh into the toothed arrangement of the coupling body 4, the sliding sleeve 3 is accelerated considerably by the pretensioned spring element 7. The damping medium in the damping chamber 6 can thereby be compressed in order correspondingly to damp, or brake, the recoil movement of the shift ring 5.

The damping medium can escape through the vent opening 8 at the damping chamber 6 in order to bring the shift ring 5 into axial abutment with the sliding sleeve 3 again. In order to be able to correspondingly control the inflow and escape of the damping medium through the vent bore 8, there can be associated with the vent opening or bore 8 at least one diaphragm or the like for controlling the inflow and outflow of the damping medium. It is further advantageous that a sealing lip 10 is associated with the damping chamber 6 in the region of the shift ring 5 functioning as a piston.

With the method according to the disclosure, gentle and noiseless abutment between the shift ring 5 and the sliding sleeve 3 with high shift dynamics is ensured.

The invention claimed is:

1. A claw coupling for interlockingly connecting a first rotatable component to a second rotatable component, comprising a sliding sleeve that is non-rotatably and axially displaceably arranged on the first rotatable component and a coupling body that is non-rotatably arranged on the second rotatable component, wherein the sliding sleeve is axially movable for interlocking connection to the coupling body in order to connect the first component to the second component, wherein at least one spring-loaded shift ring is mounted on the sliding sleeve so as to be non-rotatable and axially movable relative to the sliding sleeve, and wherein a damping chamber is formed in dependence upon relative movement for slowing down the axial movement, wherein the shift ring is coupled with an actuator for axial movement of the shift rind and of the associated sliding sleeve, the shift rind including an engagement groove therein, the actuator being disposed within with the engagement groove.

2. The claw coupling as claimed in claim 1, wherein the damping chamber can be formed by the relative movement between the sliding sleeve and the shift ring, wherein the shift ring is associated as an annular piston with the damping chamber formed at least by the sliding sleeve.

3. The claw coupling as claimed in claim 1, wherein the shift ring is coupled with the sliding sleeve via at least one spring element.

4. The claw coupling as claimed in claim 3, wherein the spring element can be tensioned between the shift ring and the sliding sleeve in the case of a tooth-to-tooth position between toothed arrangements of the sliding sleeve and the coupling body by the axial movement of the shift ring relative to a blocked sliding sleeve and, owing to a resulting relative movement between the sliding sleeve and the shift ring, the damping chamber can be formed.

5. The claw coupling as claimed in claim 4, wherein the relative movement between the shift ring and the sliding sleeve after elimination of the tooth-to-tooth position can be braked by a damping medium which has flowed into the damping chamber.

6. The claw coupling as claimed in claim 5, wherein the damping chamber has at least one vent opening for the inflow and outflow of the damping medium.

7. The claw coupling as claimed in claim 6, wherein the vent opening has at least one diaphragm for controlling the inflow and outflow of the damping medium.

8. The claw coupling of claim 4, wherein the sliding sleeve comprises an engagement arm extending outwardly from a main body of the sliding sleeve, wherein the spring engages the engagement arm to selectively move the sliding sleeve.

9. The claw coupling of claim 8, wherein the shift ring comprises an engagement arm extending outwardly from a main body of the shift ring, wherein the engagement arm of the shift ring is positioned to oppose the engagement arm of the sliding sleeve with the spring positioned therebetween.

10. The claw coupling as claimed in claim 1, wherein the damping chamber in a region of the shift ring functions as a piston and includes at least one sealing lip.

11. The claw coupling of claim 10, wherein the sealing lip comprises a first section in contact with the shift ring and a second section in contact with a portion of the sliding sleeve.

12. The claw coupling as claimed in claim 1, wherein the first component is a spur gear in the form of a movable gear and wherein the second component is a shaft in the form of an intermediate shaft.

13. An electric drive axle of a vehicle, having at least one claw coupling as claimed in claim 1.

14. The claw coupling of claim 1, wherein the sliding sleeve comprises a cylindrical portion having a toothed arrangement and a radial flange from which an annular prolongation protrudes axially.

15. A claw coupling for interlockingly connecting a first rotatable component to a second rotatable component, comprising a sliding sleeve that is non-rotatably and axially displaceably arranged on the first rotatable component and a coupling body that is non-rotatably arranged on the second rotatable component, wherein the sliding sleeve is axially movable for interlocking connection to the coupling body in order to connect the first component to the second component, wherein at least one spring-loaded shift ring is mounted on the sliding sleeve so as to be non-rotatable and axially movable relative to the sliding sleeve, and wherein a damping chamber is formed in dependence upon relative movement for slowing down the axial movement, wherein the shift ring is coupled with the sliding sleeve via at least one spring element, the spring element can be tensioned between the shift ring and the sliding sleeve in the case of a tooth-to-tooth position between toothed arrangements of the sliding sleeve and the coupling body by the axial movement of the shift ring relative to a blocked sliding sleeve and, owing to a resulting relative movement between the sliding sleeve and the shift ring, the damping chamber can be formed, wherein the relative movement between the shift ring and the sliding sleeve after elimination of the tooth-to-tooth position can be braked by a damping medium which has flowed into the damping chamber, wherein the damping chamber has at least one vent opening for the inflow and outflow of the damping medium, wherein the vent opening has at least one diaphragm for controlling the inflow and outflow of the damping medium.

16. A claw coupling for interlockingly connecting a first rotatable component to a second rotatable component, comprising a sliding sleeve that is non-rotatably and axially displaceably arranged on the first rotatable component and a coupling body that is non-rotatably arranged on the second rotatable component, wherein the sliding sleeve is axially movable for interlocking connection to the coupling body in order to connect the first component to the second component, wherein at least one spring-loaded shift ring is mounted on the sliding sleeve so as to be non-rotatable and axially movable relative to the sliding sleeve, and wherein a damping chamber is formed in dependence upon relative movement for slowing down the axial movement, wherein the damping chamber in a region of the shift ring functions as a piston and includes at least one sealing lip.

* * * * *